United States Patent
Take et al.

(10) Patent No.: US 11,495,201 B2
(45) Date of Patent: Nov. 8, 2022

(54) SOUND ABSORPTION PANEL

(71) Applicant: SHIZUKA CO., LTD., Atsugi (JP)

(72) Inventors: Koichi Take, Yokohama (JP);
Tomohisa Nakamura, Atsugi (JP);
Yoshihiko Ueki, Atsugi (JP)

(73) Assignee: SHIZUKA CO., LTD., Atsugi (JP)

(*) Notice: Subject to any disclaimer, the term of this patent is extended or adjusted under 35 U.S.C. 154(b) by 908 days.

(21) Appl. No.: 16/302,783

(22) PCT Filed: Jul. 11, 2018

(86) PCT No.: PCT/JP2018/026244
§ 371 (c)(1),
(2) Date: Nov. 19, 2018

(87) PCT Pub. No.: WO2019/039123
PCT Pub. Date: Feb. 28, 2019

(65) Prior Publication Data
US 2021/0225348 A1  Jul. 22, 2021

(30) Foreign Application Priority Data
Aug. 23, 2017  (JP) .............................. JP2017-159992

(51) Int. Cl.
*G10K 11/168* (2006.01)
*B32B 3/12* (2006.01)
(Continued)

(52) U.S. Cl.
CPC .............. *G10K 11/168* (2013.01); *B32B 3/12* (2013.01); *B32B 3/266* (2013.01); *B32B 7/12* (2013.01);
(Continued)

(58) Field of Classification Search
CPC .......... G10K 11/168; B32B 3/12; B32B 7/12; B32B 3/266; B32B 15/14; B32B 37/1284;
(Continued)

(56) References Cited

U.S. PATENT DOCUMENTS 3,211,253 A * 10/1965 Gonzalez .................. E04B 1/86
428/116
3,769,767 A * 11/1973 Scott ....................... E04C 2/365
52/145

(Continued)

FOREIGN PATENT DOCUMENTS

CN   103733251 A * 4/2014 ............... B32B 3/12
EP       1829674 A1    9/2007
(Continued)

OTHER PUBLICATIONS

Extended European Search Report for corresponding European Patent Application No. 18795918.4 dated Jan. 20, 2020 (16 sheets).

*Primary Examiner* — Forrest M Phillips
(74) *Attorney, Agent, or Firm* — Kratz, Quintos & Hanson, LLP

(57) ABSTRACT

In a sound absorption panel formed by stacking a plate perforated with a hole having a hole size smaller than a fiber length such as expanded metal, a honeycomb material, and felt-like fiber between the perforated plate and the honeycomb material, and joining the perforated plate, the felt-like fiber, and the honeycomb material to each other with an adhesive, the adhesive applied to the perforated plate is permeated into a surface of the felt-like fiber exposed from the hole to fix the fiber on the surface.

24 Claims, 9 Drawing Sheets

PLAN VIEW OF EXPANDED METAL

DIMENSION OF HOLE AT EXPANDED METAL

(51) Int. Cl.
*B32B 3/26* (2006.01)
*B32B 7/12* (2006.01)
*B32B 15/14* (2006.01)
*B32B 37/12* (2006.01)
*E04B 1/86* (2006.01)
*E04B 1/84* (2006.01)

(52) U.S. Cl.
CPC .......... *B32B 15/14* (2013.01); *B32B 37/1284* (2013.01); *E04B 1/86* (2013.01); *B32B 2266/0285* (2013.01); *B32B 2266/06* (2013.01); *B32B 2307/102* (2013.01); *B32B 2307/3065* (2013.01); *B32B 2307/54* (2013.01); *B32B 2607/00* (2013.01); *E04B 2001/8461* (2013.01)

(58) Field of Classification Search
CPC ........ B32B 2266/0285; B32B 2266/06; B32B 2307/102; B32B 2307/3065; B32B 2307/54; B32B 2607/00; E04B 1/86; E04B 2001/8461
USPC .......................................................... 181/290
See application file for complete search history.

(56) References Cited

U.S. PATENT DOCUMENTS

| | | | | |
|---|---|---|---|---|
| 3,822,762 | A * | 7/1974 | Crispin | E04B 1/86 428/117 |
| 4,084,367 | A * | 4/1978 | Saylor | B29D 24/005 428/116 |
| 4,155,211 | A * | 5/1979 | Saylor | E04B 2/7422 428/113 |
| 4,496,024 | A * | 1/1985 | Wolf | E04B 1/86 428/116 |
| 4,522,284 | A | 6/1985 | Fearon | |
| 4,630,416 | A * | 12/1986 | Lapins | E04B 1/86 181/290 |
| 6,220,388 | B1 * | 4/2001 | Sanborn | E04B 9/0457 181/290 |
| 7,743,884 | B2 * | 6/2010 | Thomas | G10K 11/172 244/119 |
| 9,469,985 | B1 * | 10/2016 | Ichihashi | E04B 1/84 |
| 9,604,714 | B2 * | 3/2017 | Perazzolo | B32B 5/18 |
| 10,876,479 | B2 * | 12/2020 | Roach | B32B 5/02 |

FOREIGN PATENT DOCUMENTS

| | | |
|---|---|---|
| GB | 1099185 A | 1/1968 |
| JP | H06-81407 A | 3/1994 |
| WO | WO-2018062606 A1 * | 4/2018 |

* cited by examiner

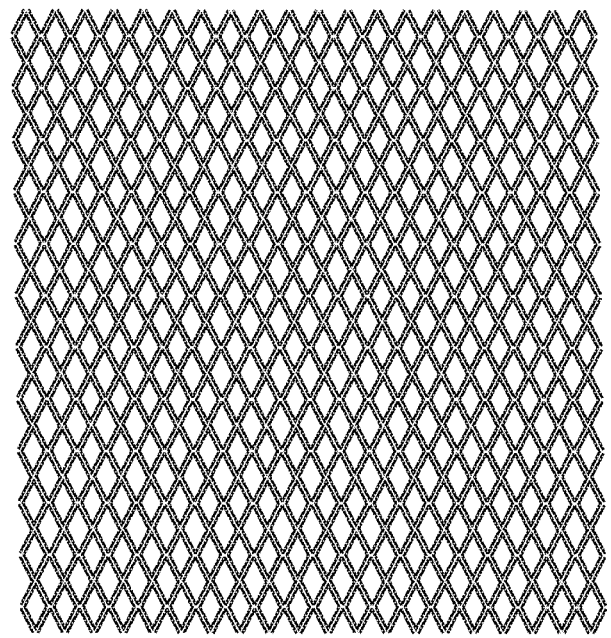
FIG. 1A    PLAN VIEW OF EXPANDED METAL
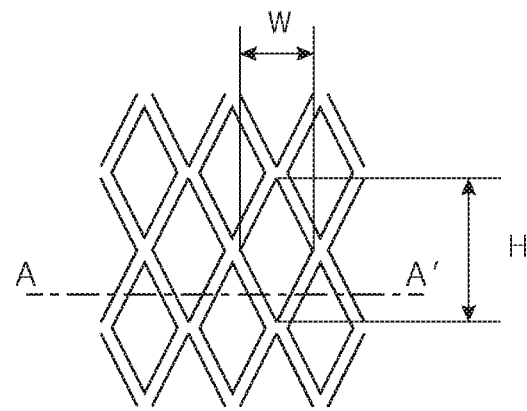
FIG. 1B    DIMENSION OF HOLE AT EXPANDED METAL
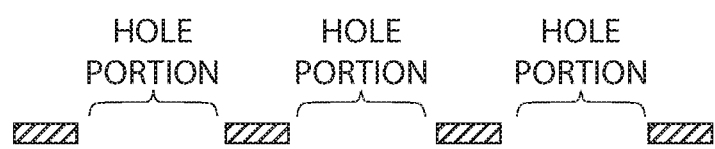
FIG. 1C    SECTIONAL VIEW OF EXPANDED METAL
SECTION ALONG AA' IN (B)

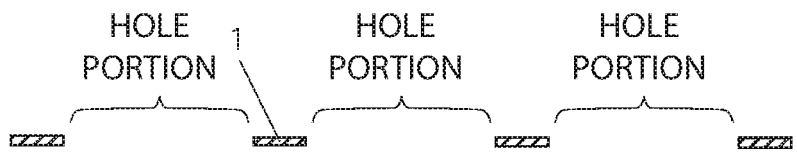
FIG. 2A  SECTIONAL VIEW OF EXPANDED METAL
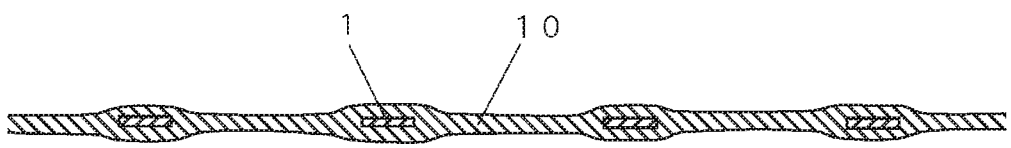
FIG. 2B  SECTIONAL VIEW SHOWING STATE IN WHICH ADHESIVE IS APPLIED TO EXPANDED METAL
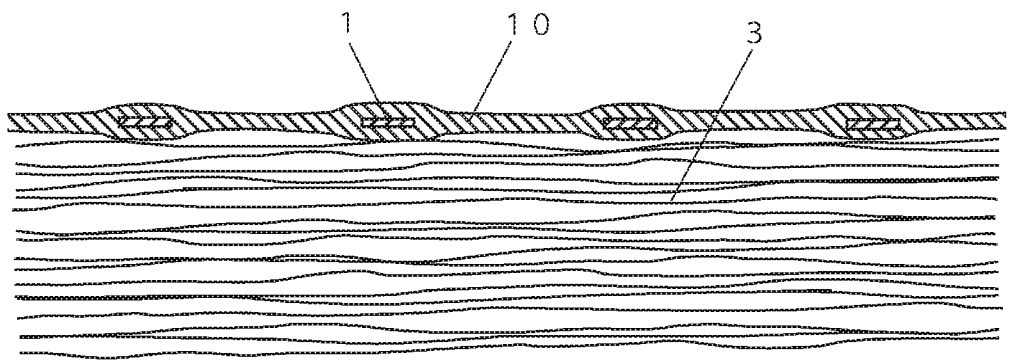
FIG. 2C  SECTIONAL VIEW SHOWING STATE IN WHICH FELT-LIKE FIBER MATERIAL IS ARRANGED TO FACE EXPANDED METAL
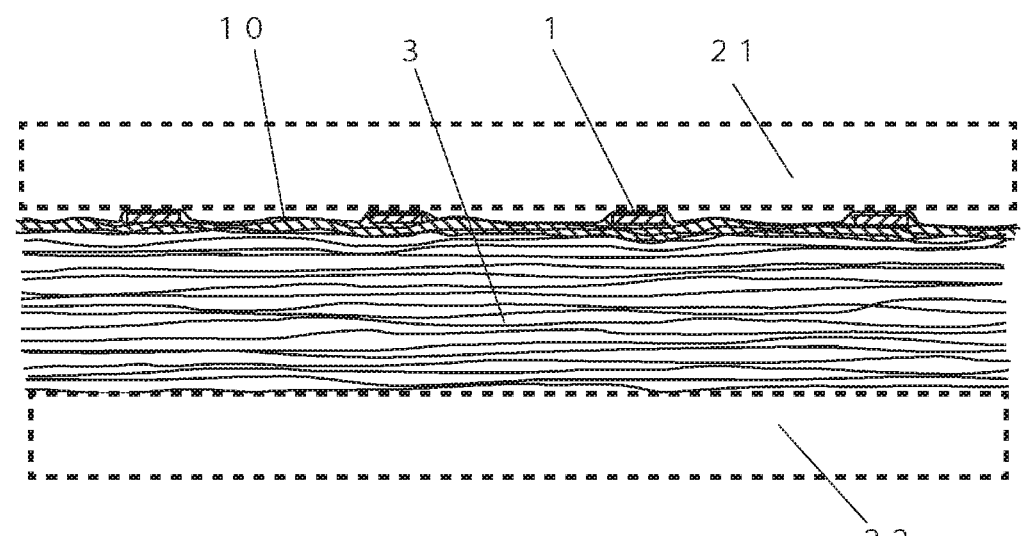
FIG. 2D  SECTIONAL VIEW SHOWING COMPRESSED STATE PRODUCED BY PRESS

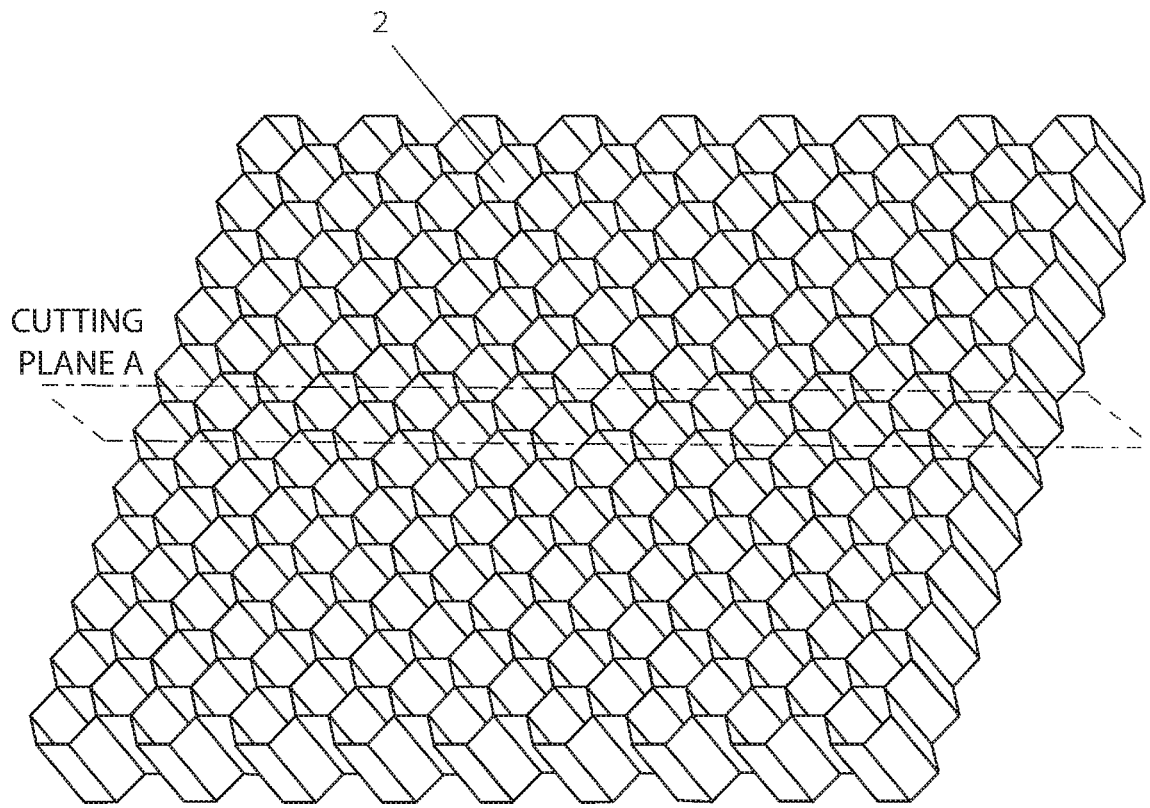
FIG. 3A  PERSPECTIVE VIEW OF HONEYCOMB MATERIAL
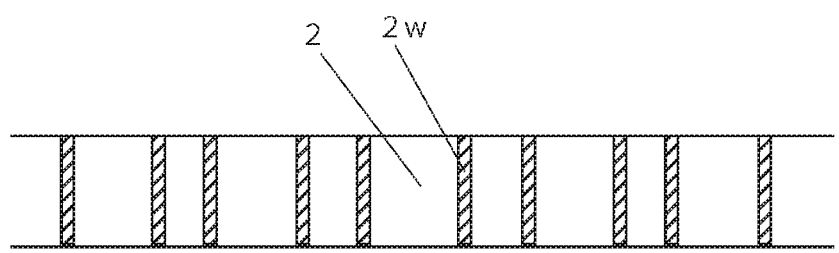
FIG. 3B  SECTIONAL VIEW OF HONEYCOMB MATERIAL
(CUTTING PLANE A)

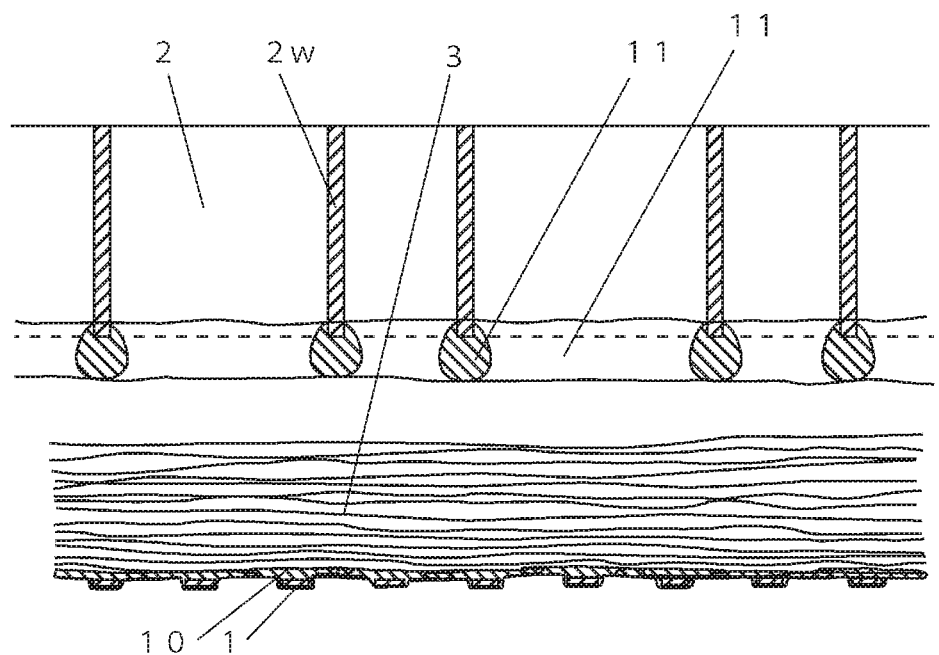
FIG. 4A  SECTIONAL VIEW SHOWING STATE IN WHICH HONEYCOMB MATERIAL AND FELT-LIKE FIBER MATERIAL ARE ARRANGED TO FACE EACH OTHER
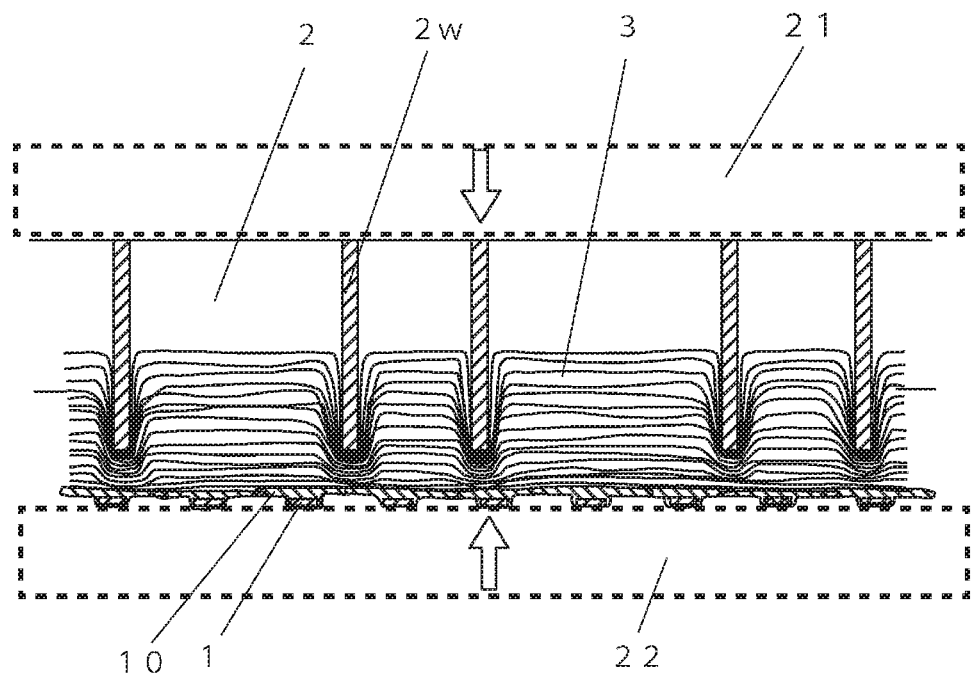
FIG. 4B  SECTIONAL VIEW SHOWING STATE IN WHICH HONEYCOMB MATERIAL, FELT-LIKE FIBER MATERIAL, AND PERFORATED PLATE ARE ADHESIVELY JOINED

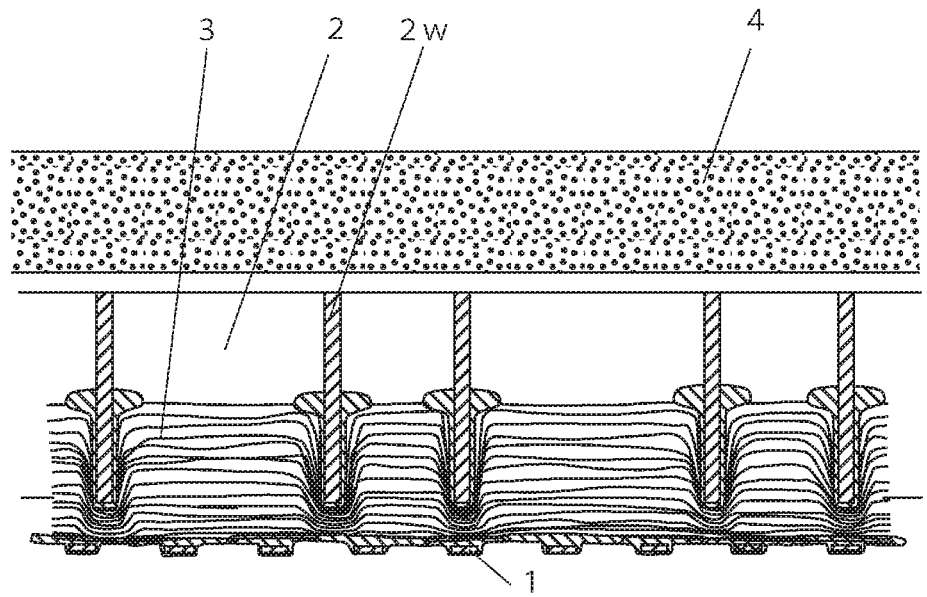
FIG. 6A SECTIONAL VIEW SHOWING STATE IN WHICH PHENOLIC FOAM IS ARRANGED TO FACE HONEYCOMB MATERIAL
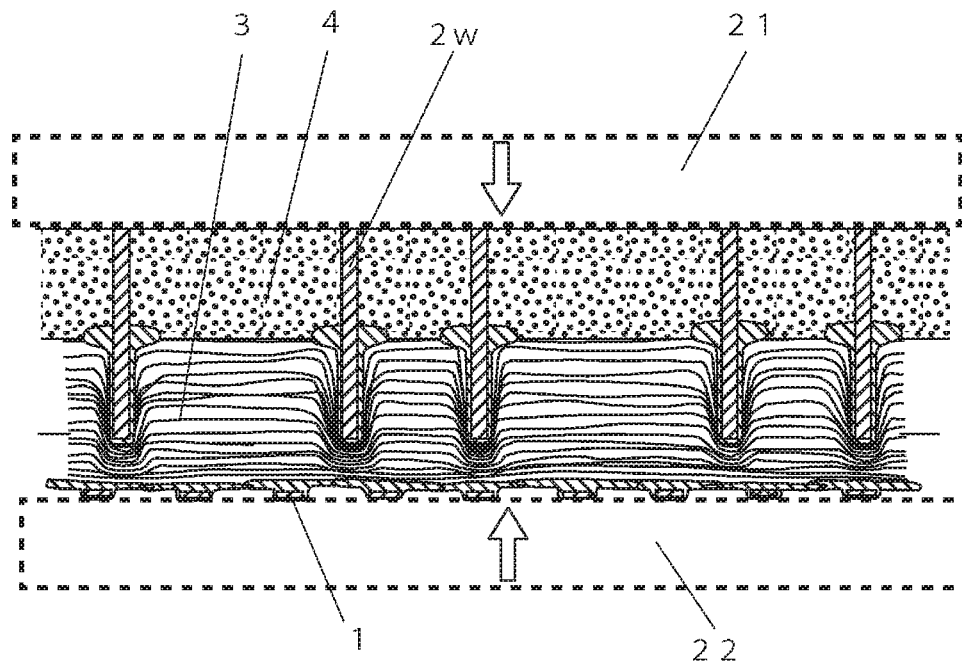
FIG. 6B
SECTIONAL VIEW SHOWING STATE IN WHICH PHENOLIC FOAM IS PUSHED AND FILLED INTO HONEYCOMB MATERIAL

SOUND ABSORPTION PANEL

TECHNICAL FIELD

The present invention relates to a sound absorption panel used as a sound shielding measure against noise sources such as industrial machines, houses, household equipment, and mobile sources.

BACKGROUND ART

A sheet-like (textile-like) nonwoven product made of a group of tightly aggregated animal based fibers, organic fibers, or inorganic (mineral) fibers and used as a sound absorption material or a heat insulator is generally called felt. A sheet-like shape is formed by a method of forming a compressed plate-like shape by means of mechanical treatment, chemical treatment, or heat treatment, for example, or by a method employing needle punching. A product manufactured by needle punching is called a needle mat. The needle mat is soft and supplied in the form of a roll.

The needle mat is a compact made of fibers having a fiber diameter from 3 to 20 μm and an individual fiber length from 10 to 200 mm. The fibers are entangled with each other to form a sheet-like shape through needle punching of pushing 5 to 20 needles per square centimeter into a fiber mat in a direction perpendicular to the length direction of the fibers using a needle punching machine.

Japanese Patent Literature No. 5558315 describes felt-like fiber in paragraphs 0014 and 0015. This patent literature states that, if the felt-like fiber is used, organic or inorganic fiber causes a problem of scattering of the fiber, and the inorganic fiber causes a problem of irritation (itching) to skin.

As a sound absorption material, metal fiber is used as well as felt-like fiber. Regarding metal fiber, Japanese Patent Application Publication No. Sho 62-282922 describes a method of manufacturing a metal porous material by providing aluminum fiber on expanded metal, and then applying pressure to pressure-bond the expanded metal and the aluminum fiber. This material is introduced as the sound absorption material Poal (available from UNIX Co., Ltd.) in the cumulative material published by Economic Research Association (General Incorporated Association), and has been commercially available.

CITATION LIST

Patent Literatures

Patent Literature 1: Publication of Japanese Patent No. 5558315

Patent Literature 2: Publication of Japanese Patent No. 1894692 (Japanese Patent Application Publication No. Sho 62-282922)

SUMMARY OF INVENTION

Technical Problem

A sheet-like item made of inorganic fiber such as glass fiber, rock wool, ceramic, silica, etc. used as a sound absorption material instead of metal fiber has a fiber length from 10 to 200 mm and a fiber diameter from 3 to 20 μm. In this sheet-like item, fiber is likely to scatter from a material surface to produce influence on a human body such as itching irritation to human skin.

Hence, a countermeasure is required to be taken against scattering of fiber and to prevent itching feeling. This may be done by a method such as a method of chemically fixing a surface using an adhesive, for example, in addition to needling punching. However, the foregoing problem has not been solved satisfactorily. In this regard, if the chemical fixing method is used for surface treatment, it becomes hard to maintain air permeability or porosity to cause clogging. In this way, a sound absorption function is affected. Meanwhile, trying to maintain porosity makes it impossible to prevent scattering and irritation to human skin satisfactorily.

There have also been different problems. Regarding a sheet-like product made of inorganic fiber such as glass fiber, rock wool, or ceramic fiber, such materials themselves are soft. Hence, even if a thickness or density is selected, problems also arise in terms of lack of flatness, self-standing performance, and surface strength against rubbing, for example.

An appropriate range of a felt-like fiber material for functioning as a sound absorption material is 70 to 160 $kg/m^3$ in terms of a density and 3 to 20 mm in terms of product thickness. However, the felt-like fiber material is a soft material and is downy, and lacks in flatness and self-standing performance. This makes the felt-like fiber material difficult to handle, so that the felt-like fiber material cannot be used alone as a surface material of a sound absorption panel.

A product with a trade name Poal Cl (available from UNIX Co., Ltd.), which includes aluminum fiber interposed between expanded metal from opposite sides, is free from scattering and irritation to human skin, etc. However, this product has a problem of high cost. According to the cumulative material published by Economic Research Association (General Incorporated Association) (October, 2016), Poal of 1 m×2 m×1.6 mm costs 23,800 yen (11,900 yen/$m^2$).

Solution to Problem

The invention according to claim 1 and the invention according to claim 2 are a sound absorption panel and a method of manufacturing the sound absorption panel having a panel structure including a stack of multiple materials adhesively joined, wherein a felt-like fiber material and a honeycomb material as part of the panel structure are arranged adjacent to each other and joined with an adhesive, a tip of a wall forming a cell of the honeycomb material is deeply forced into the felt-like fiber material, and a portion where a fiber in the felt-like fiber material near the wall forming the cell of the honeycomb material and the adhesive are integrated and solidified forms a composite structure, thereby reinforcing the cell of the honeycomb material.

The invention according to claim 3 and the invention according to claim 4 are a sound absorption panel and a method of manufacturing the sound absorption panel having a panel structure including a stack of multiple materials adhesively joined, wherein a felt-like fiber material and a perforated plate as part of the panel structure are arranged adjacent to each other and are joined with a water-soluble adhesive, the adhesive extends over an entire surface of the felt-like fiber material exposed at a hole portion of the perforated plate to fix a fiber near a surface, thereby preventing scattering of the fiber, and air permeability is provided by the presence of a gap between fibers.

The invention according to claim 5 and the invention according to claim 6 are a sound absorption panel and a method of manufacturing the sound absorption panel having a structure wherein a honeycomb material, a felt-like fiber material, and a perforated plate are joined in this order with a water-soluble adhesive, the adhesive and a tip of a wall forming a cell of the honeycomb material are deeply forced into the felt-like fiber material, a portion where a fiber in the felt-like fiber material near the wall forming the cell of the honeycomb material and the adhesive are integrated and solidified forms a composite structure, thereby reinforcing the cell, and the adhesive for joining the felt-like fiber material and the perforated plate extends over an entire surface of the felt-like fiber material exposed at a hole portion of the perforated plate to fix a fiber near a surface, thereby preventing scattering of the fiber, while air permeability is provided by the presence of a gap between fibers.

The invention according to claim 7 and the invention according to claim 8 are a sound absorption panel and a method of manufacturing the sound absorption panel having a structure including a stack of multiple materials joined with an adhesive, wherein a felt-like fiber material and a honeycomb material as part of the panel structure are adjacent to each other, the felt-like fiber material and the honeycomb material are adhesively joined to apply compressive force in a stacking direction, an end portion of a wall forming a cell of the honeycomb material is forced into the felt-like fiber material, and the felt-like fiber material is squeezed only at a portion near the wall forming the cell of the honeycomb material to provide a high fiber density, thereby providing high strength.

The invention according to claim 9 and the invention according to claim 10 are a sound absorption panel and a method of manufacturing the sound absorption panel having a structure wherein a perforated plate, a felt-like fiber material, and a honeycomb material are stacked in this order, the perforated plate, the felt-like fiber material, and the honeycomb material are joined to each other with a water-soluble adhesive, the adhesive and a tip of a wall forming a cell of the honeycomb material are deeply forced into the felt-like fiber material, a portion where a fiber in the felt-like fiber material near the wall forming the cell of the honeycomb material and the adhesive are integrated and solidified forms a composite structure, and a space in the cell of the honeycomb material is filled with rigid phenolic foam having an open-cell structure and water absorption.

The invention according to claim 11 is a sound absorption panel wherein, in the invention according to claim 9, the structure is provided with high sound absorption performance by joining and stacking a reflector without air permeability with an adhesive on a surface of the honeycomb material.

The invention according to claim 12 is a method of manufacturing a sound absorption panel wherein, in the method of manufacturing the sound absorption panel according to claim 10, high sound absorption performance is provided by joining and stacking a reflector without air permeability with an adhesive on a surface of the honeycomb material.

The invention according to claim 13 is a sound absorption panel wherein, in the sound absorption panel according to claim 11, each of the perforated plate, the felt-like fiber material, and the reflector is incombustible material, each of the honeycomb material and the phenolic foam is a flame resistant material, and the sound absorption panel as a whole is incombustible material.

The invention according to claim 14 is a method of manufacturing a sound absorption panel wherein, in the method of manufacturing the sound absorption panel according to claim 12, each of the perforated plate, the felt-like fiber material, and the reflector is incombustible material, each of the honeycomb material and the phenolic foam is a flame resistant material, and the sound absorption panel as a whole is incombustible.

The invention according to claim 15 is a sound absorption panel wherein, in the sound absorption panel according to claim 3 or 5, a hole at the perforated plate has a dimension smaller than the fiber length of a fiber in the felt-like fiber material to prevent the fiber from getting out of the hole.

The invention according to claim 16 is a method of manufacturing a sound absorption panel wherein, in the method of manufacturing the sound absorption panel according to claim 4 or 6, the used perforated plate has a hole having a dimension smaller than the fiber length of a fiber in the felt-like fiber material to prevent the fiber from getting out of the hole.

The invention according to claim 17 is a sound absorption panel, wherein the perforated plate in the invention according to claim 3, 5, or 9 is expanded metal or punching metal.

The invention according to claim 18 is a method of manufacturing a sound absorption panel, wherein expanded metal or punching metal is used as the perforated plate in the invention according to claim 4, 6, or 10.

The invention according to claim 19 is a sound absorption panel wherein, in the sound absorption panel according to claim 11, the structure in which the honeycomb material, the phenolic foam, and the reflector are integrated by being joined to each other with the water-soluble adhesive provides high self-standing strength.

The invention according to claim 20 is a method of manufacturing a sound absorption panel wherein, in the method of manufacturing the sound absorption panel according to claim 12, the honeycomb material, the phenolic foam, and the reflector are integrated by being joined to each other with the water-soluble adhesive to increase self-standing strength.

In summary, in the stacked panel structure or means for preparing the stacked panel structure of the sound absorption panel, the perforated plate and the felt-like fiber material are stacked while the adhesive is applied between the perforated plate and the felt-like fiber material. The entire structure is adhesively joined by being pressed with a pressure press. Further, the honeycomb material is coated with the adhesive and stacked on a different surface of the felt-like fiber material. Then, the entire structure is pressed strongly with the pressure press to adhesively join the honeycomb material and the felt-like fiber material while compressing a portion of the felt-like fiber material with the honeycomb material. Further, the rigid phenolic foam having an open-cell structure and water absorption is adhesively joined. The reflector may further be joined adhesively. At this time, the adhesive joint is formed by pressing the entire structure with the pressure press and applying compressive force. Thus, if compressive force is no longer applied from the pressure press when the adhesive is solidified, a state in which the felt-like fiber material is partially compressed, specifically, a state under the compressive force is maintained with the adhesive.

The structure and the action of the sound absorption panel will be described in detail. A countermeasure against the problems of scattering of fiber and irritation to human skin will be described first. This countermeasure is to adhesively join fibers through filling treatment on a surface of the felt-like fiber material, thereby preventing scattering of fibers and itching feeling to be caused by the touch with the fibers. More specifically, if expended metal or punching metal is placed on the surface of the felt-like fiber material, the surface of the felt-like fiber material is exposed from a hole portion of the expanded metal or punching metal.

By dipping the expanded metal or punching metal in a tank containing a water-soluble (emulsion) adhesive in advance and making the adhesive adhere entirely to the expanded metal or punching metal before placement of the expanded metal or punching metal, the hole portion is covered with a film of the adhesive under surface tension. Then, the felt-like fiber material and the expanded metal or punching metal are stacked to cover the surface of the felt-like fiber material exposed from the hole portion with the film of the adhesive.

Next, the expanded metal or punching metal and the felt-like fiber material are strongly pressed against each other. By doing so, the film of the adhesive having covered the entire surface of the felt-like fiber material at the hole portion comes into contact with a fiber. In another case, drying (curing reaction) resulting from evaporation of moisture in the adhesive causes shrinking effect of the coating film. As a result, the film is broken and bored to moisten the surfaces of fibers one by one having been covered entirely. In this way, the adhesive spreads.

As drying proceeds thereafter in response to further evaporation of moisture in the adhesive, curing reaction is produced. Fibers near the surface contacting each other or existing at neighboring positions are joined to each other and integrated with the adhesive adhering to the peripheries of the fibers. In this way, the solidified adhesive and the fibers form a fiber reinforced resin layer (FRP) as a composite structure. At this time, a gap remains in a portion where fibers are not adhesively joined to each other. Specifically, a state in which fibers are simply entangled with each other is changed to a state in which a large number of contact points are adhesively joined and fixed.

In a portion of the expanded metal or punching metal other than a hole, the adhesive existing between the punching metal and the felt-like fiber material permeates into a fiber near the surface to be mixed with the fiber. When the adhesive is cured, the adhesive and the fiber are integrated to form fiber reinforced resin (FRP) as a composite structure.

Fibers near the surface of the felt-like fiber material are adhesively joined to each other. As a result, scattering of the fibers is prevented. Further, even with the touch with the hole portion, feeling of itching to human skin does not occur. Additionally, the dimension of a hole at the perforated plate is smaller than a fiber length from 10 to 200 mm. Thus, even if there is a fiber not having been fixed through adhesive joining, this fiber does not get out of the hole. This structure is also applicable to a sheet-like felt-like fiber material after subjected to needle punching.

The foregoing phenomenon utilizes the fact that, regarding the felt-like fiber material viewed at a micro level, a large gap is defined between fibers, and the water-soluble (emulsion) adhesive permeates into the felt-like fiber material while moistening the surfaces of the fibers aligned in a plane direction and does not permeate into the felt-like fiber material in a thickness direction. In this way, the adhesive spreads over the entire surface of the felt-like fiber material exposed from the hole portion of the expanded metal or punching metal.

A measure responsive to the problem of self-standing performance will be described next. Adhesively joining the perforated plate to the foregoing felt-like fiber material also achieves flatness and self-standing performance to some extent. However, this is not sufficient for obtaining firm self-standing performance. In the present invention, to obtain firm self-standing performance, the honeycomb material is adhesively joined to a surface of the felt-like fiber material different from the surface of the felt-like fiber material adhesively joined to the perforated plate. The felt-like fiber material is interposed between the honeycomb material and the perforated plate to form a stacked panel. In this way, strength achieving self-standing performance can be ensured.

Specifically, when the honeycomb material is to be adhesively joined to the felt-like fiber material, the honeycomb material and the felt-like fiber material are interposed in the press and pressed against each other more strongly than in the case of adhesively joining the perforated plate. In this step, the tip of the wall forming the cell of the honeycomb material is deeply forced into the felt-like fiber material to reduce the thickness of the felt-like fiber material by the compression to about a half around a portion contacting the tip. This increases a density to increase strength.

At this time, the adhesive applied in advance to the wall forming the cell of the honeycomb material moistens the surfaces of fibers near the surface and the compressed portion of the felt-like fiber material around the periphery of the wall. When the adhesive is dried and solidified, the adhesive is integrated with the fibers to form fiber reinforced resin (FRP) as a composite structure.

This composite structure increases the strength of the honeycomb material to eventually achieve intended self-standing performance. A technique of forcing a honeycomb material into a sponge and adhesively joining the honeycomb material and the sponge previously invented by the present inventors is merely to form an adhesive joint with an adhesive while increasing the area of the adhesive joint. Unlike the present invention, this technique is not to form a composite structure including the adhesive and the felt-like fiber material.

Further, to increase the sound absorption performance of the resultant sound absorption panel, the inside of the cell of the honeycomb material can be filled with the rigid phenolic foam having an open-cell structure as a different sound absorption material.

Additionally, adhesively joining the reflector to a surface of the honeycomb material opposite a surface of the honeycomb material adhesively joined to the felt-like fiber material can achieve high sound shielding performance and at the same time, can protect the cell of the honeycomb material. This further achieves firmer self-standing performance.

In terms of cost, the structure of the present invention formed by stacking and adhesively joining the perforated plate (expanded metal), the felt-like fiber material, and the honeycomb material can be provided at a price half of the price of a comparative item, a product with a trade name Poal Cl available from UNIX Co., Ltd. including aluminum fiber and expanded metal that costs 23,800 yen (11,900 yen/m²) for an item of 1 m×2 m (cumulative material published by General Incorporated Association: Economic Research Association (October, 2016)).

Advantageous Effects of Invention

In the sound absorption panel using the felt-like fiber material such as a rock wool glass mat instead of metal fiber, interposing the felt-like fiber material between expanded metal and the honeycomb material and adhesively joining these materials was confirmed to be capable of solving the problems of preventing scattering of fiber and preventing irritation to skin.

A panel easy to handle and having self-standing performance was achieved by interposing the rock wool glass mat between the expanded metal and the honeycomb material and adhesively joining the materials. Additionally, adhesively joining the reflector was confirmed to be capable of solving the problem of achieving self-standing performance and surface strength sufficient to withstand rough handling at a worksite. At the same time, the capability to increase sound shielding performance was confirmed.

A resultant weight is 1.04 kg/m², which is smaller by 60% than a weight of 2.6 kg/m² determined by using the aluminum fiber sound absorption material "trade name Poal C-1".

The cost of the sound absorption panel of the present invention was confirmed be a half or less, compared to a sound absorption panel using the aluminum fiber material described in the cumulative material published by Economic Research Association (General Incorporated Association) (October, 2016).

The sound absorption performance of the sound absorption panel of the present invention was measured, and was confirmed to achieve high sound absorption performance in a wide frequency band.

BRIEF DESCRIPTION OF DRAWINGS

FIG. 1a, FIG. 1b and FIG. 1c are views of a perforated plate (expanded metal).

FIG. 2a, FIG. 2b, FIG. 2c and FIG. 2d are sectional views of a stack including a felt-like fiber material and the perforated plate.

FIG. 3a and FIG. 3b are views of a honeycomb material.

FIG. 4a and FIG. 4b are sectional views of a stack including the honeycomb material, the felt-like fiber material, and the perforated plate.

FIG. 6a and FIG. 6b are sectional views showing the cell of the honeycomb material filled with rigid open-cell phenolic foam.

EMBODIMENTS FOR CARRYING OUT INVENTION

Example 1

Figure 5A:
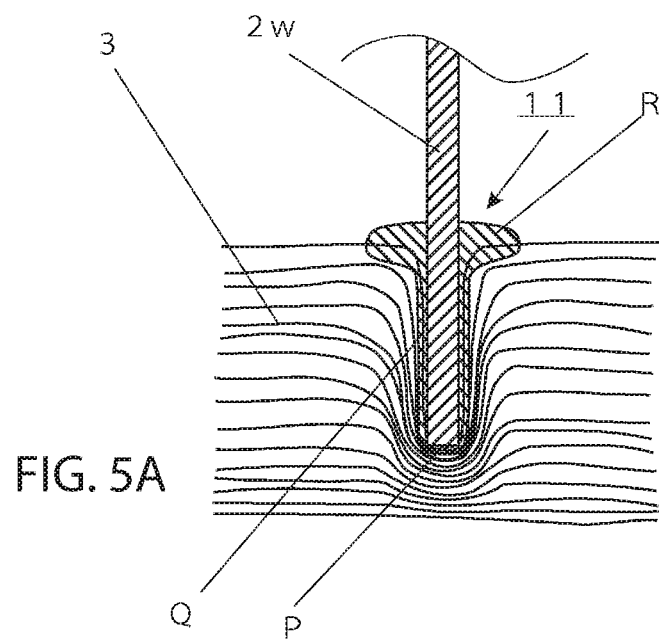
FIG. 5a and FIG. 5b are conceptual views showing a state in which a tip of a wall forming a cell of the honeycomb material is forced into the felt-like fiber material.

FIG. 4(b) shows the sectional structure of a sound absorption panel formed by stacking and adhesively joining a perforated plate 1, a felt-like fiber material 3, and a honeycomb material 2 to each other. A press upper platen 21 and a press lower platen 22 do not form part of the sound absorption panel. An appropriate adhesive to be applied for joining the perforated plate 1 and the felt-like fiber material 3 is a water-soluble emulsion based adhesive. More specifically, the adhesive can be selected from vinyl acetate resin based adhesives, acrylic resin based adhesives, ethylene-vinylacetate copolymer resin (EVA) based adhesives, and further from vinyl chloride based adhesives, vinylidene chloride based adhesives, urethane based adhesives, epoxy based adhesives, and polyester based adhesives, for example.

Viscosity is an important point for making the selection. An appropriate viscosity range is selected so as to conform to the dimension of a hole at the perforated plate and so as to fulfill two conditions: to cover a hole portion with a film under surface tension in a step of making the adhesive adhere to the perforated plate 1 as shown in the sectional view of FIG. 2(b); and to prevent the adhesive from moving to the felt-like fiber material 3 and from blocking the hole portion of the perforated plate in a subsequent step of adhesively joining the perforated plate 1 and the felt-like fiber material 3. To fulfill these conditions, a water content may be adjusted by adding water. In this example, moisture was adjusted by using a vinyl acetate resin based adhesive (Konishi CX50 "containing a non-volatile component of 45% and moisture of 55%").

The perforated plate 1 being expanded metal or punching metal capable of achieving weight reduction is appropriate to the present invention. In this example, expanded metal made of an A1050 aluminum material having a thickness of 0.6 mm and an opening (hole) of W4×H8 mm was selected. FIG. 1(a) shows a plan view of the expanded metal. The expanded metal has slits expanded into a rhomboid shape by forming the slits in a staggered pattern in a metallic thin plate, and pulling the metallic thin plate in a direction vertical to the direction of the slits. FIG. 1(c) shows a part of the section of a position in an enlarged manner indicated as AA' in FIG. 1(b).

In this example, as a countermeasure against scattering of fiber, a lateral dimension of W=4.0 mm and a vertical dimension of H=8.0 mm were employed to set the opening dimension of the hole at 10 mm or less, which is a minimum of a fiber length, as shown in FIG. 1(b) in an enlarged manner. The thickness and the width of the perforated plate relate to self-standing performance, so that appropriate dimensions may be selected in terms of the dimensions and the self-standing performance of a panel to be commercialized.

To make the felt-like fiber material 3 deliver sound absorption performance and heat-insulating properties, the felt-like fiber material 3 is prepared by using organic or inorganic fibers as a raw material, stacking multiple layers of such fibers, and forming the fibers into a thin plate-like shape through needling punching of piercing the fibers repeatedly with thin needles. Organic fibers (chemical fibers or natural fibers), inorganic fibers (glass fibers, rock wool, etc.) are used as the fibers.

In this example, a rock wool glass mat "RGM" (available from YAMATO RIKEN KOGYO CO., LTD.) was used as the felt-like fiber material 3. This material was manufactured by mixing rock wool fibers and glass fibers of a length from 10 to 200 mm and treating the mixed fibers through needling punching. This material has excellence in incombustibility, resistance to heat (700° C.), and sound absorption performance. A thickness from 3 to 15 mm is selectable for this material. In this example, a density from 100 to 120 kg/m³ and a thickness of 5 mm were selected.

The felt-like fiber material 3 may be a glass fiber based mat instead of a rock wool based mat. In this example, a rock wool based mat having a small content of glass causing little itching to skin was selected. As the nature of the rock wool based mat, the rock wool based mat has advantages that it is a material having a heat resistance temperature higher than that of a glass fiber based mat by 100° C., being available up to 700° C., and not containing asbestos.

FIG. 2(d) is a sectional view showing a state in which the perforated plate 1 and the felt-like fiber material 3 are stacked on each other. In the drawings of FIG. 2a, FIG. 2b, FIG. 2c and FIG. 2d showing the section of the perforated plate 1, a sign is given to only one place of this section to avoid complication. This also applies to different drawings. The perforated plate 1 is expanded metal, and the felt-like fiber material 3 is a rock wool glass mat.

FIG. 2(a) shows the section only of the expanded metal. As shown in FIG. 2(b), the perforated plate 1 is dipped in a horizontal container containing an adhesive 10 prepared by emulsifying an existing vinyl acetate based emulsion adhesive ("containing a non-volatile component of 45% and moisture of 55%") again by adding water appropriately. Then, the adhesive 10 is made to adhere to the entire surface of the perforated plate 1 so as to cover the hole portion with a film of the adhesive under surface tension.

There is an appropriate range for the amount of water to be added to the vinyl acetate based emulsion adhesive determined by the size of the hole at the expanded metal. Whether being within the appropriate range is determined by whether the hole at the expanded metal is covered with a film and the amount of adhesion is sufficient, conversely, whether the film having covered the hole portion is broken after curing of the adhesive, and whether the air permeability of the felt-like fiber material 3 is maintained through conduction of an air permeability test, for example.

As shown in FIG. 2(c), before the adhesive 10 is dried and cured, the rock wool glass mat after subjected to needle punching is stacked on the adhesive 10 so as to face the adhesive 10. Then, the rock wool glass mat is interposed in exfoliate paper not shown in the drawings, interposed between the press upper platen 21 and the press lower platen 22, pressurized in a stacking direction, and compressed, as shown in FIG. 2(d). By ding so, the film of the adhesive having covered the hole portion comes into contact with the felt-like fiber material 3, or is shrunk by being dried and is broken. In this way, the adhesive moves to the felt-like fiber material 3, moistens a fiber near a surface of the felt-like fiber material 3, and permeates into the fiber. At this time, the felt-like fiber material 3 is compressed in the same way over the entire surface.

The surface of the felt-like fiber material 3 is covered with an infinite number of thin bristles (fibers). As a result of tiny structures and chemical properties on the surface, apparent water repellency (what is called lotus effect) is produced to prevent the adhesive 10 from permeating into the felt-like fiber material 3 easily. In response to this, the felt-like fiber material 3 is pressed with the expanded metal with the adhering adhesive 10, and the surface of the felt-like fiber material 3 including the adhesive 10 is squeezed. This removes the apparent water repellency to make the adhesive 10 permeate into the felt-like fiber material 3.

As shown in FIG. 2(d), the adhesive 10 applied to the perforated plate 1 comes into contact with the felt-like fiber material 3 when pressure is applied from the press. When the film of the adhesive 10 at the hole portion comes into contact with fibers, or when drying (curing reaction) resulting from evaporation of moisture in the adhesive causes shrinking effect of the coating film, the film is broken to remove the apparent water repellency of the felt-like fiber material 3. Then, the surfaces of the fibers near the surface are moisten one by one with the adhesive 10.

At this time, substantially no permeation of the adhesive 10 occurs in the thickness direction of the felt-like fiber material 3. The adhesive 10 moistens only the fibers and their vicinities touched by the adhesive 10 while a film of the adhesive 10 is formed near the surface of the felt-like fiber material 3 so as to cover the hole portion of the perforated plate 1. This phenomenon is generated from the fact that the fibers in the felt-like fiber material 3 extend in a plane direction, and the water-soluble adhesive having large surface tension has been selected.

Figure 9A:
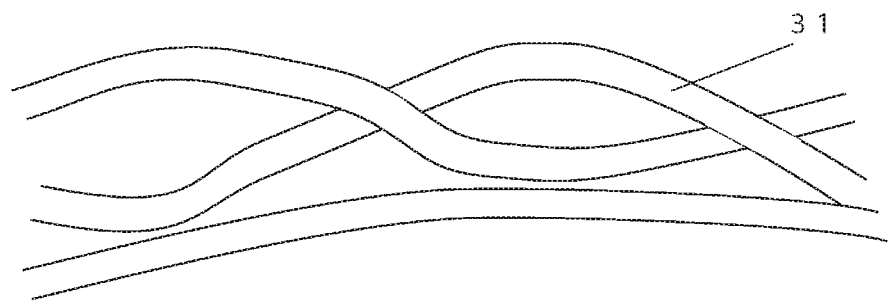
FIG. 9a, FIG. 9b and FIG. 9c are conceptual views of a fiber state at a micro level.
Figure 9B:
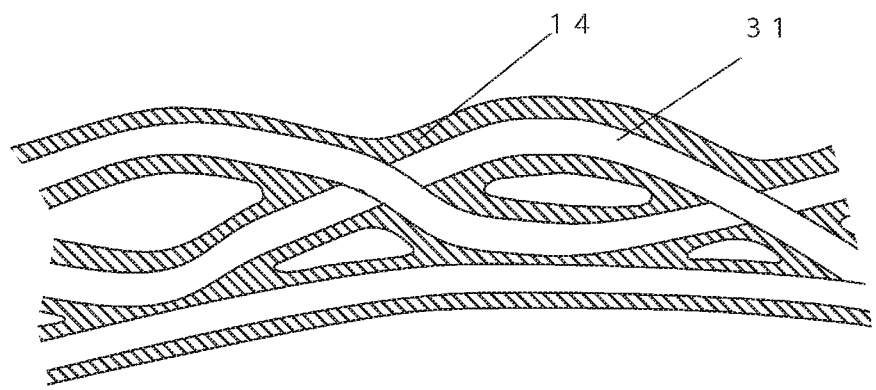
Figure 9C:
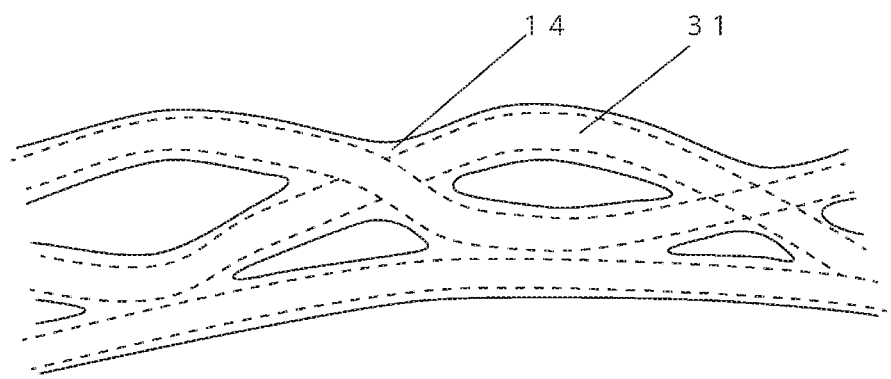

FIG. 9a, FIG. 9b and FIG. 9c show the concept of the state of fibers in the felt-like fiber material viewed at a micro level. FIG. 9(a) shows a state in which the fibers are simply entangled with each other through needling punching. FIG. 9(b) is a sectional view showing a state in which surfaces of the fibers are moistened with an adhesive and the adhesive spreads. FIG. 9(c) shows a state in which the adhesive is solidified to fix the fibers to each other. As shown in FIG. 9(a), only a part of one fiber and only a part of another fiber contact each other or are close to each other. As understood from FIG. 9(b), the fibers are separated from each other even at a place permeated with the adhesive 10 to define a space therebetween.

Specifically, in this structure, the adhesive 10 merely moistens the surfaces of the fibers and it does not fill a space between one fiber and another fiber, and only a part of one fiber and only apart of another fiber contact each other or are close to each other to maintain a space between these fibers. As shown in FIG. 9(c), as a result of drying and solidifying the adhesive while maintaining the adhesive in this state, the adhesive is shrunk by being dried compared to the case in FIG. 9(b). Thus, air permeability between fibers is ensured over the felt-like fiber material 3 entirely exposed from the hole at the perforated plate 1. In this way, sound absorption performance is maintained.

The reason for applying the adhesive entirely over the expanded metal is to ensure the amount of adhesion to the expanded metal and to cover the hole portion with a film. The reason is also to prevent corrosion of the expanded metal. An emulsion based adhesive is white in a liquid state and becomes transparent in a cured state. This change in color achieves favorable effect in an aesthetic aspect for commercialization. Further, by coating the surface of the expanded metal uniformly through application of the emulsion based adhesive, even if a burr is left unremoved on the surface of the expanded metal, this burr can be covered with the adhesive. This further achieves the effect of smoothening the surface of the expanded metal.

Meanwhile, the rock wool glass mat and the expanded metal do not have sufficient hardness. Hence, if the expanded metal of an elongated shape is stacked and adhesively joined to only one surface of the rock wool glass mat as the felt-like fiber material like in the foregoing way, and if effort is made for self standing of the panel formed by the stacking, the panel does not become flat but it warps. As a countermeasure against this issue, a material having strength is stacked further on a surface of the rock wool glass mat opposite the surface of the rock wool glass mat adhesively joined to the expanded metal. By doing so, the warpage can be prevented.

This method will be described below. FIG. 3(a) shows a perspective view of the honeycomb material 2 used as a material having strength, not to shrink, and being lightweight. A hexagonal cell of the honeycomb material is formed of a thin wall. In this example, a lightweight and strong honeycomb material having a cell size of 20 mm, a thickness of 30 mm, and a thickness of 0.35 mm at a wall forming a cell ("magnesium silicate mixed paper honeycomb core" available from TIGEREX Co., Ltd) was selected. This honeycomb material was adhesively joined to the rock wool glass mat so as to face the rock wool glass mat. FIG. 3(b) shows the sectional view of the honeycomb material 2 taken along a cutting plane A in FIG. 3(a).

FIG. 4(a) shows the details of a state in which a lower end portion of a wall of the honeycomb material 2 is coated with a vinyl acetate resin emulsion based adhesive 11. In this state, the lower end portion of a wall 2w forming a cell of the honeycomb material 2 is coated with the adhesive 11. In FIG. 4a and FIG. 4b and its following drawings, the thickness of the felt-like fiber material 3 is exaggerated largely, compared to the thickness of the honeycomb material 2. A dashed line in FIG. 4(a) shows the lower end of the wall 2w forming the cell of the honeycomb material 2. Wavy lines above and below the dashed line show the upper end and the lower end of the adhesive 11 adhering to the lower end portion of the wall 2w forming the cell.

Specifically, the honeycomb material 2 was placed horizontally, and a lower tip of the wall 2w forming the cell of the honeycomb material 2 was dipped in a container containing the adhesive, thereby making the vinyl acetate resin emulsion based adhesive 11 (containing a non-volatile component of 45% and moisture of 55%) of a sufficient amount adhere to the lower tip.

As shown in FIG. 4(b), the honeycomb material 2 is arranged so as to face a panel from above including the foregoing stack of the perforated plate 1 (specifically, expanded metal) and the felt-like fiber material 3 (specifically, rock wool glass mat). Then, as shown in FIG. 4(b), the stack is interposed between the press upper platen 21 and the press lower platen 22 and pressed as shown by vertical arrows. By doing so, the lower end of the wall forming the cell of the honeycomb material 2 is forced into the felt-like fiber material 3 to compress a portion of the felt-like fiber material 3 facing the lower end.

At this time, force applied for the pressing is larger than force applied for adhesively joining the felt-like fiber material 3 and the perforated plate 1. As a result, the felt-like fiber material 3 is compressed only at the portion facing the tip of the wall forming the cell of the honeycomb material 2. By doing so, an original thickness of 5 mm is reduced to a thickness of 2 to 3 mm.

As a result of the foregoing steps, the felt-like fiber material 3 is increased in strength at the portion compressed and increased in density. Further, the adhesive 11 adhering to the lower side of the wall forming the cell of the honeycomb material 2 and a fiber are entangled with each other to form an FRP-like structure, thereby increasing the strength of the cell of the honeycomb material 2. In this way, the stacked panel is provided with a structure having strength that allows self-standing of the panel. The thickness and the material of the honeycomb material 2 are not limited to those in this description in taking this measure responsive to strength.

FIG. 4(b) shows a portion in more detail where the adhesive 11 applied to the wall 2w forming the cell of the honeycomb material 2 permeates into the felt-like fiber material 3. In this drawing, the adhesive 11 is omitted with the intention of showing how the end portion of the wall 2w forming the cell of the honeycomb material 2 is pushed into a portion of the felt-like fiber material 3 to compress this portion. Thus, the following explanation proceeds by further referring to FIG. 5a and FIG. 5b in which the adhesive 11 is illustrated.

Manufacturing steps will be described again in detail by referring to FIG. 4(b). A surface of the honeycomb material 2 coated with the vinyl acetate resin emulsion based adhesive 11 (containing a non-volatile component of 45% and moisture of 55%) is arranged so as to face a surface of the felt-like fiber material 3 (specifically, rock wool glass mat) not adhesively joined to the perforated plate 1 (specifically, expanded metal).

Next, the felt-like fiber material 3 is interposed in the press and pressure is applied as shown by the arrows in the drawing. By doing so, while the felt-like fiber material 3 (specifically, rock wool glass mat) is depressed at a portion facing the wall 2w forming the cell of the honeycomb material 2, the felt-like fiber material 3 is reduced in thickness, specifically, a gap between fibers is reduced. At the same time, the adhesive 11 permeates between fibers near the wall 2w forming the cell of the felt-like fiber material 3. In this way, an FRP-like composite structure including the adhesive 11 and the felt-like fiber material 3 is formed.

According to the foregoing procedure, the perforated plate 1 (specifically, expanded metal) and the felt-like fiber material 3 (specifically, rock wool glass mat) are first adhesively joined. Then, the honeycomb material 2 is adhesively joined. This procedure, however, causes a problem that the perforated plate 1 is likely to be deformed during the procedure. To solve this problem, a procedure may also be such that the felt-like fiber material 3 (specifically, rock wool glass mat) and the honeycomb material 2 are adhesively joined first, and then the perforated plate 1 (specifically, expanded metal) is adhesively joined.

Figure 5B:
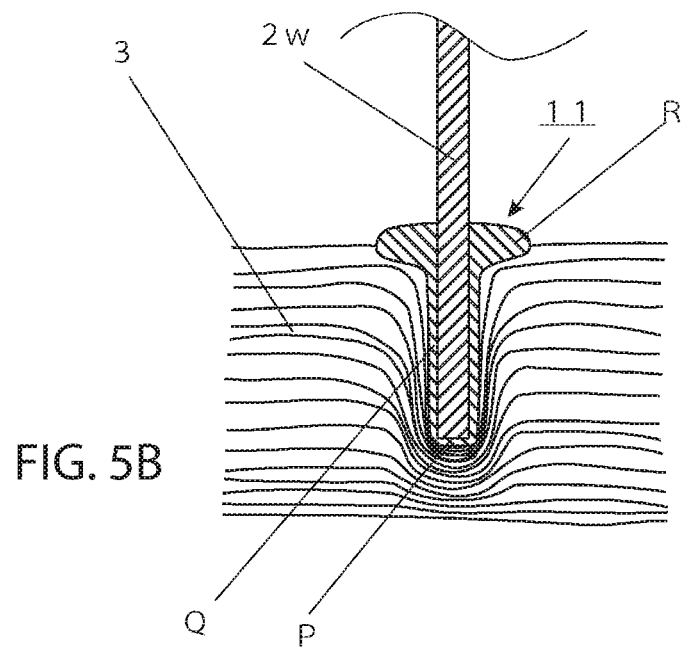

FIG. 5a and FIG. 5b show one tip of the wall 2w forming the cell of the honeycomb material 2 in an enlarged manner with the addition of the adhesive 11 omitted from FIG. 4(b). In FIG. 5(a), the adhesive is illustrated as a transparent part to make fibers visible. In FIG. 5(b), the adhesive is illustrated as a non-transparent part in order to facilitate visual recognition of the adhesive.

A part of the adhesive 11 wiped off with a fiber when the tip of the wall 2w forming the cell is forced into the rock wool glass mat to remain on a surface is called an R part. A part of the adhesive 11 adhering to the periphery of a lower part of the wall 2w forming the cell of the honeycomb material 2 and remaining on this periphery is called a Q part. A part of the adhesive 11 remaining under the tip of the wall 2w forming the cell in the drawings is called an P part. The P part and the R part extend around the wall 2w forming the cell to a dimension of 1 to 2 mm in the plane direction (horizontal direction in the drawings), and permeate into fibers near the surface of the rock wool glass mat to form fiber reinforced resin (FRP).

The adhesive 11 permeates to a thickness from 0.5 to 1.0 mm into fibers having a shape like a U-shape near the wall 2w forming the cell of the honeycomb material 2 at the P part where the adhesive 11 exists with respect to the tip of the wall 2w forming the cell of the honeycomb material 2 as a center, and at the Q part where the adhesive 11 exists on the wall surface of this wall. In this way, resin in the solidified adhesive is integrated with the fibers to be reinforced using the wall as a core, thereby forming the fiber reinforced resin (FRP) to achieve a structure with high strength.

In terms of the sound absorption panel as a whole, the P part and the R part are solidified around the wall 2w forming the cell, and the FRP with continuous hexagons are formed on the entire surface of the rock wool glass mat. By doing so, the panel achieves strength of preventing curvature or bending when the panel is made to stand by itself. With an initial thickness of 5 mm, a portion of the rock wool glass mat facing an end portion of the wall 2w forming the cell of the honeycomb material 2 is compressed to a thickness of 2 to 3 mm. In this way, the self-standing performance of the sound absorption panel is ensured by three strengths including the perforated plate, the compressed portion of the felt-like fiber material, and the composite structure (FRP) around the wall forming the cell of the honeycomb material.

As shown in FIG. 5a and FIG. 5b, a portion of the rock wool glass mat not facing the tip of the wall 2w forming the cell of the honeycomb material 2, namely, a portion not to be compressed is not squeezed in the thickness direction and is maintained at a thickness from 4 to 5 mm. If the rock wool glass mat is squeezed, the sound absorption performance of the rock wool glass mat is degraded. In this regard, the wall 2w forming the cell of the honeycomb material 2 is thin and the ratio of the area of a portion to be squeezed to the area of the entire rock wool glass mat is low. Thus, this causes substantially no reduction in the performance of the rock wool glass mat as the sound absorption panel.

As described above, regarding adhesive joining between the perforated plate and the felt material and adhesive joining between the honeycomb material and the felt material, pressure applied for joining of the honeycomb material is sufficiently larger than pressure applied for joining of the perforated plate. By doing so, on the perforated plate side, the coating film of the adhesive is formed on an individual fiber near the surface of the felt-like fiber material to prevent scattering of the fiber while sound absorption performance is ensured. Meanwhile, on the honeycomb material side, the tip of the wall is p pushed into the felt-like fiber material to change a sectional shape from a flat-plate shape to a U-shape. In this way, a composite structure including the adhesive and a fiber is formed near the wall surface of the honeycomb material to increase strength, while sound absorption performance as a whole is ensured.

The strength of the felt-like fiber material 3 may be increased by a method of increasing a density by increasing the number of needles to be pushed in. However, this method fails to increase a density uniformly only at a necessary portion. In this example, the honeycomb material is used, and the felt-like fiber material 3 is compressed by being pressed with an end portion of the wall of the honeycomb material. By doing so, a density is increased only at the compressed portion to allow formation of a strength support layer. The step described in the foregoing example is mainly for adhesively joining the honeycomb material after adhesively joining the perforated plate to the felt material. In an alternative step, the perforated plate may be joined adhesively after the honeycomb material is adhesively joined to the felt material.

In this example, the magnesium silicate mixed paper honeycomb core is used as the honeycomb material. However, the honeycomb material is not limited to this core but it may also be a honeycomb core using metal, resin, or a different type of paper as a material. A cell size appropriate to the present invention is from 15 to 25 mm. If a cell size is small, much of the area of the rock wool glass mat is squeezed with the wall 2w forming the cell. This unfortunately reduces the thickness of the rock wool glass mat to reduce sound absorption effect. Conversely, if a cell size is too large, self-standing performance and strength are reduced to interfere with handling. These problems can be avoided by selecting an appropriate cell size like in this embodiment.

In this embodiment, to improve self-standing performance, a density from 130 to 150 kg/m$^3$ and a thickness of 5 mm were selected for the rock wool glass mat.

The shape of the cell of the honeycomb material 2 is not limited to the hexagonal shape shown in the drawings. The felt-like fiber material 3 is not limited to the rock wool glass mat. An effective range for the density of the felt-like fiber material 3 is from 70 to 160 kg/m$^3$.

Example 2

FIG. 6a and FIG. 6b are sectional views of an example 2 of the sound absorption panel intended to achieve a still higher sound absorption coefficient. In addition to the structure shown in FIG. 4a and FIG. 4b, the cell of the honeycomb material is filled with open-cell water-absorbing phenolic foam. As shown in FIG. 6(a), rigid phenolic foam 4 having an open-cell structure and water-absorption, and having a comparable thickness to the honeycomb material 2 is stacked on a surface of the honeycomb material 2 opposite the surface of the honeycomb material 2 adhesively joined to the felt-like fiber material so as to face this surface of the honeycomb material 2 (while the thickness of the phenolic foam 4 is from 28 to 29 mm, this thickness is not shown to be comparable to that of the honeycomb material 2 for exaggerating the thickness of the felt-like fiber material 3 to facilitate understanding in the drawings). Next, as shown in FIG. 6(b), the structure is interposed in the press and pressed strongly in the stacking direction, thereby pushing and filling the phenolic foam 4 into a space in the cell of the honeycomb material.

The phenolic foam 4 is selected from the viewpoint of whether the phenolic foam 4 has an open-cell structure, and sound absorption performance and water absorption performance. A density range appropriate to the present invention is from 16 to 30 kg/m$^3$. In this example, a density of 20 kg/m$^3$ was selected. A foam material to be used is not limited to the phenolic foam material in this description but may be any rigid foam material having an open-cell structure and water absorption.

Rigid phenolic foam is obtained by making various modifications to phenolic resin, and foaming and curing the phenolic resin. Among foamed plastics, the rigid phenolic foam has the most thermally and chemically stable properties and excellent heat-insulating properties, sound shielding properties, and flame resistance. A closed-cell structure or an open-cell structure is obtained in a manner that depends on a condition for foaming. Having an open-cell structure achieves the effect of high sound absorption performance.

To facilitate work to be done at a stage of joining the honeycomb material 2 and the felt-like fiber material 3 adhesively, removing moisture promptly from the water-soluble adhesive 10 is required. In this regard, the water-absorbing phenolic foam 4 is pushed into a position where the adhesive 11 adheres to the honeycomb material 2, and the phenolic foam 4 absorbs the moisture, thereby achieving the effect of facilitating drying and curing.

Example 3

Figure 7:
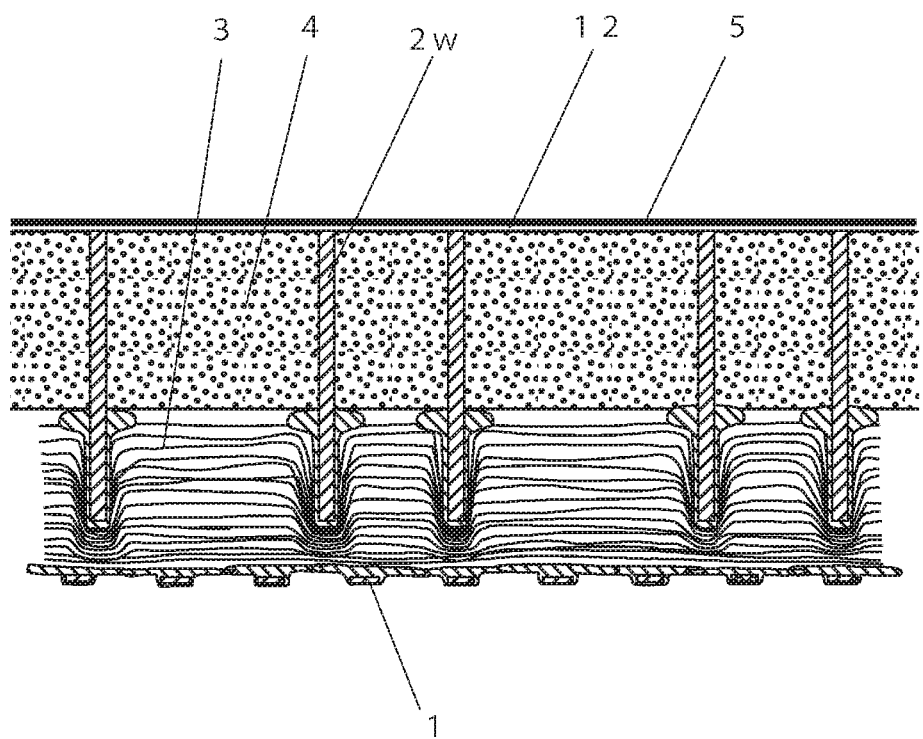
FIG. 7 is a sectional view of a stack including a reflector, the honeycomb material, the felt-like fiber material, and the perforated plate.
Figure 8:
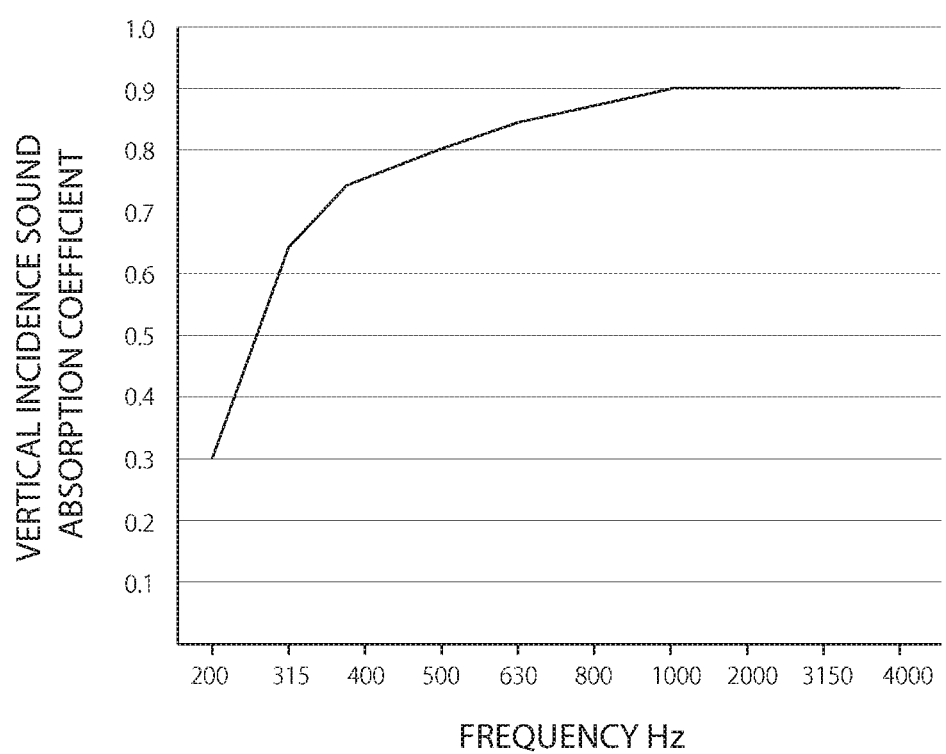
FIG. 8 is a graph of a vertical incidence sound absorption coefficient.

FIG. 7 is a sectional view of a different example of the sound absorption panel intended to achieve still higher sound shielding performance. In addition to the process to the step in FIG. 6a and FIG. 6b, a reflector 5 without air permeability (specifically, without sound absorption performance) is joined with an adhesive 12 to a surface of the honeycomb material 2 opposite the surface of the honeycomb material 2 adhesively joined to the felt-like fiber material 3. The reflector 5 is selected from metallic materials, wooden materials, organic materials, and inorganic materials without air permeability in consideration of mass, cost, and sound shielding function. In this example, a painted aluminum plate having a thickness of 1.2 mm was used in terms of cost, weight, incombustibility, and an aesthetic aspect. A resultant sound absorption panel was confirmed to achieve sound absorption performance shown in FIG. 8.

An epoxy based adhesive was used for joining the reflector 5 and the honeycomb material 2. However, the adhesive is not limited to epoxy based adhesives.

Example 4

A sound absorption panel described as a still different example has the same structure as that in FIG. 7 described in the example 3, and uses incombustible paper having a thickness of 1.0 mm as the reflector 5 (TIGEREX "incombustible board GX10NA, incombustibility certification NM-2285, available from TIGEREX Co., Ltd). The other used materials include expanded metal having a thickness of 0.5 mm as the perforated plate 1, a rock wool glass mat having a thickness of 5 mm as the felt-like fiber material 3 (rock wool glass mat RGM 5-100 incombustibility certification NM-8112, available from YAMATO RIKEN KOGYO CO., LTD.), the honeycomb material 2 having a thickness of 30 mm, and the rigid phenolic foam 4 having an open-cell structure filled into the cell of the honeycomb material and having the same thickness of 30 mm as the honeycomb material 2. As a result, a total thickness including an adhesive layer was 37 mm and a measured weight was 3.7 kg/m$^2$.

In the case of a structure invented by the present inventors having a structure similar to that of the example shown in FIG. 7 and using different materials, more specifically, if an aluminum fiber material having a thickness of 1.6 mm is used as a member corresponding to the perforated plate 1 and the felt-like fiber material 3, and if an aluminum plate having a thickness of 1.2 mm is used as the reflector 5, the total thickness and the weight of a resultant sound absorption panel were 32.8 mm and 8 kg/m$^2$ respectively. By contrast, this example could achieve a weight reduction by 53.75%.

In the structure of the sound absorption panel shown in FIG. 7 according to this example, by using expanded metal made of an A1050 aluminum material as the perforated plate 1, using the magnesium silicate mixed paper honeycomb core available from TIGEREX as the Co., Ltd honeycomb material 2, using a rock wool glass mat as the felt-like fiber material 3, using open-cell water-absorbing phenolic foam as the phenolic foam 4, using incombustible paper as the reflector 5, and using a vinyl acetate based emulsion adhesive as the adhesive 12 and for joining between different parts, the structure of the sound absorption panel shown in FIG. 7 was confirmed to achieve incombustibility comparable to that of a different sound absorption panel invented by the present inventors and having received incombustibility certification (incombustibility certification NM-3167).

Conditions for making the sound absorption panel as a whole incombustible are as follows. The panel is required to have a front surface and a back surface. The perforated plate, the felt fiber, and the reflector to contact the outside world are required to have incombustibility. Meanwhile, the honeycomb material and the phenolic foam material inside the sound absorption panel are not to directly contact flame in the outside world. However, these materials are required not to ignite spontaneously under a high temperature. This condition is slightly milder than the condition for incombustibility and will be called flame resistance herein for distinction from incombustibility.

A solid component (filler) in the water-soluble vinyl acetate based emulsion adhesive (CX-50, available from Konishi Co., Ltd.) used for stacking the layers has resistance to flame. After application of this adhesive, the adhesive permeates into each of the materials including the water-absorbing incombustible paper, the rigid phenolic foam having an open-cell structure, and the honeycomb material to tightly connect the incombustible materials and form a sealed structure inside the sound absorption panel in which the phenolic foam material is surrounded by the honeycomb material and the reflector. By the presence of this sealed structure, supply of oxygen from the outside world is shielded to make the inside of the sound absorption panel hard to ignite with flame even if the exterior of the sound absorption panel is exposed to fire.

Air permeability is maintained at the perforated plate and the felt fiber side of the sound absorption panel. If the outside of the sound absorption panel is placed at a high temperature, the inside of the sound absorption panel is also placed at a high temperature to emit cracked gas from an organic component in the adhesive or the phenolic foam material. The cracked gas contains a high concentration of carbon dioxide. As a result, even with the presence of air permeability at the perforated plate and the felt fiber of the sound absorption panel, oxygen does not flow into the sound absorption panel from the outside to prevent combustion from the inside of the sound absorption panel.

The foregoing sealed structure and the generated carbon dioxide gas act to avoid the presence of oxygen necessary for combustion inside the sound absorption panel. Thus, even if not all the elements forming the sound absorption panel are incombustible but some of the components are flame resistant, the sound absorption panel structure shown in FIG. 7 becomes incombustible. This could achieve the incombustible sound absorption panel while simultaneously achieving a reduced weight, compared to a weight resulting from use of an aluminum plate.

The honeycomb material 2, the phenolic foam 4, and the reflector 5 are water-absorbing materials. If the reflector 5 is entirely coated with the water-soluble vinyl acetate based emulsion adhesive (CX-50, available from Konishi Co., Ltd.) and then adhesively joined to the honeycomb material 2 and the phenolic foam 4, the adhesive applied to the reflector 5 permeates into the honeycomb material 2, the phenolic foam 4, and the reflector 5 to connect these materials tightly to an extent that layers of the adhesive between the materials become invisible. Specifically, this stacked structure is a completely integrated structure, making it possible to increase the self-standing strength of the sound absorption panel. This self-standing performance was confirmed using a panel having dimensions of 450×910×37 mm, and a panel having dimensions of 910×1820×37 mm.

REFERENCE SINGS LIST

1 Perforated plate (expanded metal)
2 Honeycomb material
2w Wall forming cell

3 Felt-like fiber material (rock wool glass mat)
31 Fiber
4 Phenolic foam
5 Reflector (material without air permeability)
10 Adhesive
11 Adhesive
12 Adhesive
14 Adhesive
21 Press upper platen
22 Press lower platen
P Composite structure formed of adhesive and fiber near wall tip of cell
Q Composite structure formed of adhesive and fiber near wall surface of cell
R Composite structure formed of adhesive and fiber in surface layer of felt material

The invention claimed is:

1. A sound absorption panel having a panel structure including a stack of multiple materials adhesively joined, wherein
a felt-like fiber material and a perforated plate as part of the panel structure are joined with a water-soluble adhesive,
the adhesive extends over an entire surface of the felt-like fiber material exposed at a hole portion of the perforated plate to fix a fiber near a surface, thereby preventing scattering of the fiber, and
air permeability is provided by the presence of a gap between fibers.

2. The sound absorption panel according to claim 1, wherein
a hole at the perforated plate has a dimension smaller than the fiber length of a fiber in the felt-like fiber material to prevent the fiber from getting out of the hole.

3. A sound absorption panel wherein
the perforated plate according to claim 1 is expanded metal or punching metal.

4. A method of manufacturing a sound absorption panel having a panel structure including a stack of multiple materials adhesively joined, wherein
a felt-like fiber material and a perforated plate as part of the panel structure are joined with a water-soluble adhesive,
the adhesive is extended over an entire surface of the felt-like fiber material exposed at a hole portion of the perforated plate to fix a fiber near a surface, thereby preventing scattering of the fiber, while air permeability is provided by maintaining a gap between fibers.

5. A method of manufacturing a sound absorption panel, wherein
expanded metal or punching metal is used as the perforated plate according to claim 4.

6. The method of manufacturing a sound absorption panel according to claim 4, wherein
the used perforated plate has a hole having a dimension smaller than the fiber length of a fiber in the felt-like fiber material to prevent the fiber from getting out of the hole.

7. A sound absorption panel having a structure of a honeycomb material, a felt-like fiber material, and a perforated plate joined in this order with a water-soluble adhesive, wherein the adhesive for joining the felt-like fiber material and the perforated plate extends over an entire surface of the felt-like fiber material exposed at a hole portion of the perforated plate to fix a fiber near the surface, thereby preventing scattering of the fiber, while air permeability is provided by the presence of a gap between fibers.

8. The sound absorption panel according to claim 1, wherein
a hole at the perforated plate has a dimension smaller than the fiber length of a fiber in the felt-like fiber material to prevent the fiber from getting out of the hole.

9. A sound absorption panel wherein
the perforated plate according to claim 7 is expanded metal or punching metal.

10. A method of manufacturing a sound absorption panel of a honeycomb material, a felt-like fiber material, and a perforated plate joined in this order with a water-soluble adhesive, the method comprising:
dipping the perforated plate in a tank containing a water-soluble adhesive in advance and making the adhesive adhere entirely to the perforated plate, a hole portion of the perforated plate being covered with a film of the adhesive under surface tension,
stacking the perforated plate to cover surface of the felt-like fiber material exposed from the hole portion with the film of the adhesive,
joining adhesively the perforated plate and the felt-like fiber material with compressive force in a stacking direction to make the film of the adhesive at the hole portion break,
extending the adhesive, which joins the felt-like fiber material and the perforated plate, over an entire surface of the felt-like fiber material that is exposed at the hole portion to fix a fiber near the surface, and
thereby preventing scattering of the fiber from the hole, while air permeability is provided by maintaining of a gap between fibers.

11. The method of manufacturing a sound absorption panel according to claim 10, wherein
the used perforated plate has a hole: having a dimension smaller than the fiber length of a fiber in the felt-like fiber material to prevent the fiber from getting out of the hole.

12. A method of manufacturing a sound absorption panel, wherein
expanded metal or punching metal is used as the perforated plate according to claim 10.

13. A sound absorption panel having a panel structure including a stack of multiple materials joined with an adhesive, wherein
a felt-like fiber material and a honeycomb material as part of the panel structure are adjacent to each other,
the felt-like fiber material and the honeycomb material are adhesively joined to apply compressive force in a stacking direction,
an end portion of a wall forming a cell of the honeycomb material is forced into the felt-like fiber material, and
the felt-like fiber material is squeezed only at a portion near the wall forming the cell of the honeycomb material to provide a high fiber density, thereby providing high strength.

14. A method of manufacturing a sound absorption panel having a panel structure including a stack of multiple materials joined with an adhesive, wherein
a felt-like fiber material and a honeycomb material as part of the panel structure are arranged adjacent to each other,
compressive force is applied in a stacking direction when the felt-like fiber material and the honeycomb material are adhesively joined, and an end portion of a wall forming a cell of the honeycomb material is forced into the felt-like fiber material to squeeze the felt-like fiber material only at a portion near the wall forming the cell of the honeycomb material, thereby producing a state of a high fiber density to increase strength.

15. A sound absorption panel having a structure wherein
a perforated plate, a felt-like fiber material, and a honeycomb material are stacked in this order,
the perforated plate, the felt-like fiber material, and the honeycomb material are joined to each other with a water-soluble adhesive,
the adhesive and a tip of a wall forming a cell of the honeycomb material are deeply forced into the felt-like fiber material,
a portion where a fiber in the felt-like fiber material near the wall forming the cell of the honeycomb material and the adhesive are integrated and solidified forms a composite structure, and
a space in the cell of the honeycomb material is filled with rigid phenolic foam having an open-cell structure and water absorption.

16. The sound absorption panel according to claim 15, wherein the structure is provided with high sound absorption performance by joining and stacking a reflector without air permeability with an adhesive to a surface of the honeycomb material.

17. The sound absorption panel according to claim 16, wherein
each of the perforated plate, the felt-like fiber material, and the reflector is an incombustible material,
each of the honeycomb material and the phenolic foam is a flame resistant material, and
the sound absorption panel as a whole is incombustible.

18. A sound absorption panel wherein
the perforated plate according to claim 15 is expanded metal or punching metal.

19. A method of manufacturing a sound absorption panel, wherein
a perforated plate, a felt-like fiber material, and a honeycomb material are stacked in this order,
the perforated plate, the felt-like fiber material, and the honeycomb material are joined to each other with a water-soluble adhesive,
the adhesive and a tip of a wall forming a cell of the honeycomb material are deeply pushed into the felt-like fiber material,
a portion where a fiber in the felt-like fiber material near the wall forming the cell of the honeycomb material and the adhesive are integrated and solidified forms a composite structure, and
rigid phenolic foam having an open-cell structure and water absorption is stacked on a surface of the honeycomb material so as to face the surface of the honeycomb material, and an entire structure is pressed strongly in a stacking direction, thereby forcing the phenolic foam into a space in the cell of the honeycomb material to fill the space.

20. A method of manufacturing a sound absorption panel, wherein expanded metal or punching metal is used as the perforated plate according to claim 19.

21. The method of manufacturing a sound absorption panel according to claim 19, wherein high sound absorption performance is provided by joining and stacking a reflector without air permeability with an adhesive on a surface of the honeycomb material.

22. The method of manufacturing a sound absorption panel according to claim 21, wherein
each of the perforated plate, the felt-like fiber material, and the reflector is an incombustible material,
each of the honeycomb material and the phenolic foam is flame resistant, and
the sound absorption panel as a whole is incombustible.

23. The sound absorption panel according to claim 16, wherein
the structure in which the honeycomb material, the phenolic foam, and the reflector are integrated by being joined to each other with the water-soluble adhesive provides high self-standing strength.

24. The method of manufacturing a sound absorption panel according to claim 21, wherein
the honeycomb material, the phenolic foam, and the reflector are integrated by being joined to each other with the water-soluble adhesive to increase self-standing strength.

* * * * *